United States Patent [19]
Tayloe et al.

[11] Patent Number: 5,918,175
[45] Date of Patent: Jun. 29, 1999

[54] METHOD AND APPARATUS FOR REGISTERING MOBILE USER GROUPS

[75] Inventors: Daniel Richard Tayloe, Phoenix; Nathan West Miller, Tempe; Kenneth Lee Sowles, Chandler; Robert Thomas Frederick, Chandler; Baldev Kaur Sangha, Chandler, all of Ariz.

[73] Assignee: Motorola, Inc., Schaumburg, Ill.

[21] Appl. No.: 08/755,677

[22] Filed: Nov. 25, 1996

[51] Int. Cl.⁶ .................................................. H04B 7/185
[52] U.S. Cl. ............................................ 455/427; 455/435
[58] Field of Search .................................. 455/406, 408, 455/427, 428, 429, 430, 432, 433, 435, 450, 452, 455, 458, 38.3, 343; 340/825.44

[56] References Cited

U.S. PATENT DOCUMENTS

| | | | |
|---|---|---|---|
| 5,097,499 | 3/1992 | Consentino | 455/432 |
| 5,627,528 | 5/1997 | Kuzinski | 455/38.3 |

OTHER PUBLICATIONS

An article entitled "AT & T Phones" from Sky Magazine, Sep. 1996, p. 164.
An article entitled "GTE Phones", from Sky Magazine, Sep. 1996, p. 165.

*Primary Examiner*—Thanh Cong Le
*Attorney, Agent, or Firm*—Frank J. Bogacz; Sherry J. Whitney

[57] ABSTRACT

A multiple subscriber unit (MSU) (600) is co-located with a mobile vehicle (110) and is coupled to multiple communication units (620) which can be used by MSU users to establish communication links between the MSU users and other terminals. The MSU (600) and a method for operating the MSU perform selective registration (200–210, 300–322) for the MSU users. In order to reduce unnecessary registration traffic, only after the MSU determines (202, 303) that a particular MSU user desires to receive incoming calls will the MSU register (208, 320) the particular MSU user with a communication system. If an MSU user does not desire to receive incoming calls, the MSU will not register (204, 304) the MSU user with the communication system.

17 Claims, 6 Drawing Sheets

METHOD AND APPARATUS FOR REGISTERING MOBILE USER GROUPS

FIELD OF THE INVENTION

This invention relates generally to radio telecommunications and, more particularly, to providing communication services to groups of communication system users who are co-located in a mobile vehicle.

BACKGROUND OF THE INVENTION

Providing telephone communication services to multiple passengers of airplanes has become common. Prior art systems use on-board equipment (i.e.,equipment co-located with the airplane) which provides multiple communication channels between the airplane and a ground-based antenna which is in range of the airplane. The ground-based antenna is connected to a Public Switched Telephone Network (PSTN) which provides communication services to ground-based telephony equipment. Ground-based antennas can be linked together over terrestrial hard-wired links or though satellite links (e.g., geosynchronous satellite links).

One prior art, airplane communication system pre-assigns a "user code" or "personal identification number" (PIN) to passengers who might want to use on-board communication resources during their flight. The user code or PIN is assigned to a passenger before the passenger embarks. The passenger can disseminate the user code to any person who might want to reach the passenger during the flight. To register with the system or to place a call during the flight, the passenger enters the pre-assigned user code into the seat back handset.

The system checks a registration database to determine the airplane's location and the seat at which the passenger is located. After the system identifies the airplane's location and sends a message to the airplane via an in-range ground-based antenna, the passenger's seat back handset notifies the passenger of the incoming call.

For a ground-to-air call, a person wishing to contact the passenger during the flight (referred to herein as a "ground calling party") can do so by dialing a central system number (e.g., a "1-800" number), entering the passenger's pre-assigned user code, and entering the ground calling party's phone number. The system then contacts the passenger and, if the passenger accepts the call, the system calls the ground calling party back. The process of first calling a central number and being contacted by the system in a second, return call is referred to as "two-stage dialing with callback".

Several aspects of this prior art system are inefficient and make using the system inconvenient for both the passenger and others who wish to contact the passenger. For example, each airplane communication system has a number of available communication numbers which it can allocate to passengers. The airplane communication system must register and occasionally re-register every available number, whether or not the numbers are actually used by passengers. Registration and re-registration traffic consumes large amounts of system resources.

In addition, as explained previously, the prior art system uses two-stage dialing with callback, which is less convenient than if the ground calling party could directly contact the passenger using a single phone number. In addition, the prior art system does not accommodate passengers who do not have a pre-assigned user code or PIN. The requirement of the pre-assigned user code is also undesirable because the ground calling party must have knowledge of the user code in order to contact the passenger.

A group of co-located passengers traveling in a common vehicle (e.g., an airplane, bus, ship) are referred to herein as a "mobile user group" or "co-located mobile users". Where there are mobile user groups, it is desirable to be able to serve tow groups of passengers, i.e., those that have PIN cards and those that do not. In addition, where the communications link between passengers in a vehicle and non-passengers is a satellite link, only a limited number of communication channels may be available for use.

What is needed is a method and apparatus which reduces the quantity of registration traffic, allows direct inward dialing to a passenger during ground-to-air call attempts, direct outward dialing by passengers, and minimized loading on the system.

DETAILED DESCRIPTION

The method and apparatus of the present invention reduces the quantity of registration traffic by registering only those users who want the opportunity to receive and pay for incoming calls. In addition, the method and apparatus of the present invention enables direct inward dialing to a passenger by a non-passenger by utilizing one-stage dialing rather than two-stage dialing with callback. The method and apparatus of the present invention also provides communication services to a member of a mobile user group who has not been pre-assigned a user code of PIN by the system. Further, the method and apparatus of the present invention minimizes voice delay in communication systems which utilize satellite links by using low- or medium-earth satellite links rather than geosynchronous satellite links. Further, the method and apparatus of the present invention provides for minimizing loading on the system facilities by registering only as many registration numbers as are required to service the current user demand.

Figure 1:
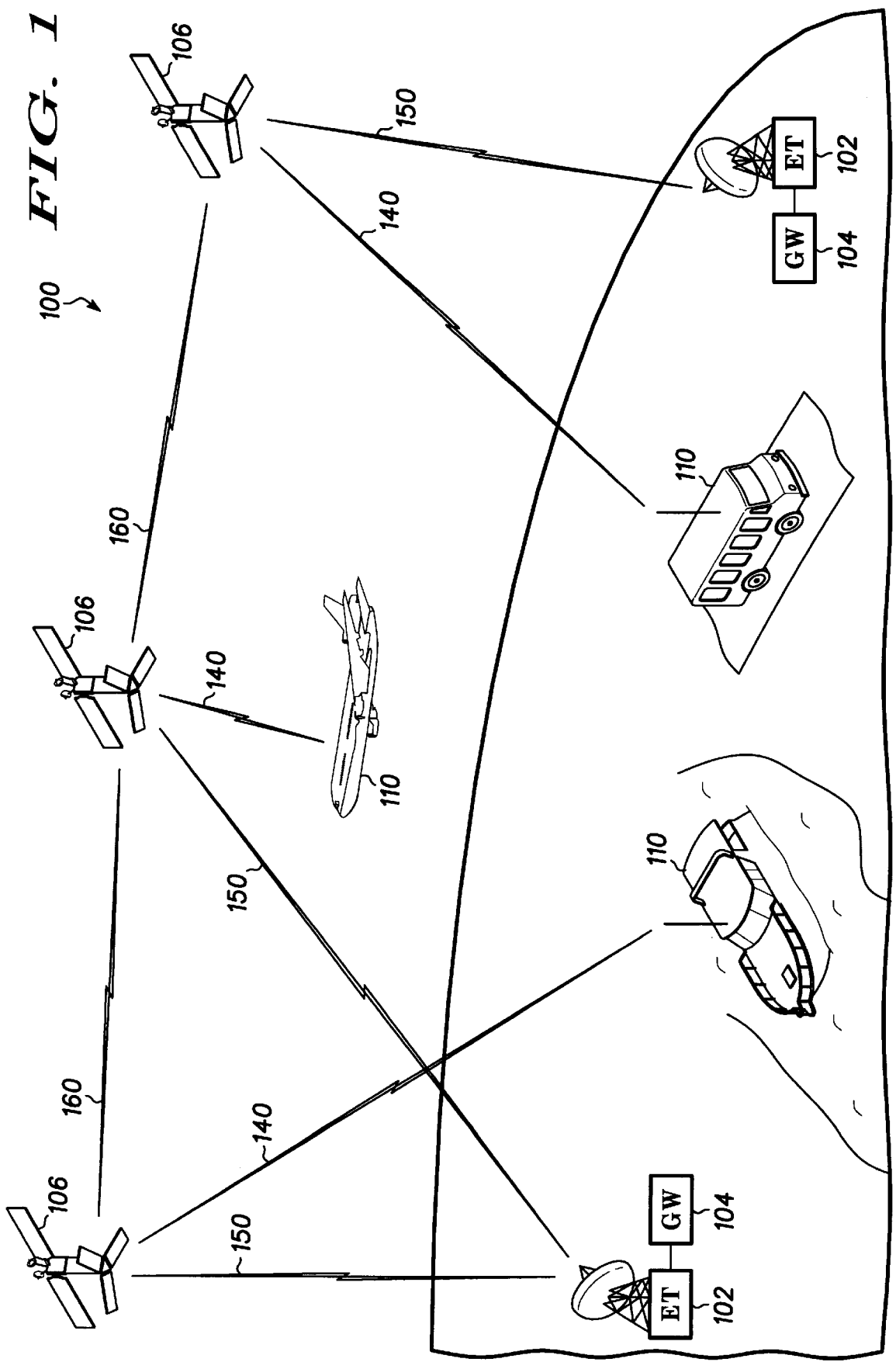
FIG. 1 illustrates a radio telecommunication system in accordance with a preferred embodiment of the present invention.

FIG. 1 illustrates a radio telecommunication system 100 in accordance with a preferred embodiment of the present invention. System 100 includes at least one Earth Terminal 102 (ET), which desirably includes a ground-based antenna that communicates either directly or indirectly with one or more mobile vehicles 110. Mobile vehicles 110 are generally of a type desired to transport groups of co-located persons. For example, mobile vehicles 110 could include busses, ships, monorails, and airplanes, although this list is not exhaustive.

In a referred embodiment, system 100 includes one or more satellites 106. Vehicles 110 communicate with satellites 106 over links 140 and ETs 102 communicate with satellites 106 over links 150. Satellites 106 are capable of communicating with each other over cross-links 160 and can relay messages received from vehicles 110 and ETs 102 to their desired destination (e.g., another vehicle 110 or ET 102).

In an alternate embodiment, system 100 includes satellites which do not communicate directly with vehicles 110, but instead are used to relay messages between ETs 102 using cross-links 160. In still another embodiment, system 100 does not include satellites 106 and vehicles 110 communicate directly with ETs 102. The particular apparatus and types of communication links used to provide communication paths between vehicles 110 and ETs 102 can be modified from the embodiments described without departing from the scope of the present invention.

In a preferred embodiment, satellites 106 are low- or medium-earth orbit satellites rather than prior-art geosynchronous satellites. Using low- or medium-earth orbit satellites minimizes time delays which can be experienced for voice communication traffic which is sent along a communication path which uses satellites as nodes. In alternate embodiments, geosynchronous satellites could be used.

As used herein, the communication equipment co-located with the mobile vehicle is referred to as a Multiple Subscriber Unit (MSU). For purposes of this description, when information is transferred along a communication path between an MSU located on vehicle 110 and some other device (e.g., a gateway 104 (GW) or a communication unit operated by a non-passenger), the particular transmission medium and number of intermediate nodes which comprise the path are not important to the invention and can be varied depending on the system. For example, a communication path between an MSU on vehicle 110 and a GW 104 might include an RF link 140 between the MSU on vehicle 110 and a satellite 106, several cross-links 160 between satellites, a down-link 150 to an ET 102, and land-line links between the ET 102 and the GW 104. Any number of different communicating paths could be used.

ETs 102 are connected to GWs 104 which provide communications capabilities with other communication networks (not shown), such as Public Switched Telephone Networks (PSTN) or ground-based cellular communication systems, for example. In a preferred embodiment, GW 104 occasionally participates in passenger registration and supports call setup between passengers and non-passengers. GW 104 receives passenger registration information from communication equipment (FIG. 6) co-located with mobile vehicle 110.

The MSU performs two major functions. First, the MSU communicates over a communication path to a GW 104. Typically, the communication path includes at least one RF link via satellite 106 over links 140 and 150 and in some instances links 160. However, some systems (e.g., a system supporting monorail communications) might have no RF links. Second, the MSU interfaces with multiple communication units which can be operated by MSU users (i.e., passengers). The communication units can be, for example, telephone handsets and seatback handsets, faxes, computers, or data processing units which are coupled to the MSU using hard wired, optical, or RF links.

As used herein, an "MSU user" is a person, typically but not necessarily a passenger, who uses a communication unit associated with the MSU. Although the description often refers to communications being established with "non-passengers", such communications could be established with any other person or terminal, whether or not the person or terminal is co-located with the mobile vehicle. In essence, the MSU enables information to be gathered from MSU users, sent to a GW, and vice versa. Typically, the MSU has a limited number of communication channels available.

In accordance with a preferred embodiment of the present invention, MSU user registration can be performed by two types of MSU users: those who are already associated with a home network and have a subscriber identification and those who do not. The registration process for the former type of MSU user is described in conjunction with FIG. 2. The registration process for the latter type of MSU user is described in conjunction with FIG. 3.

Figure 2:
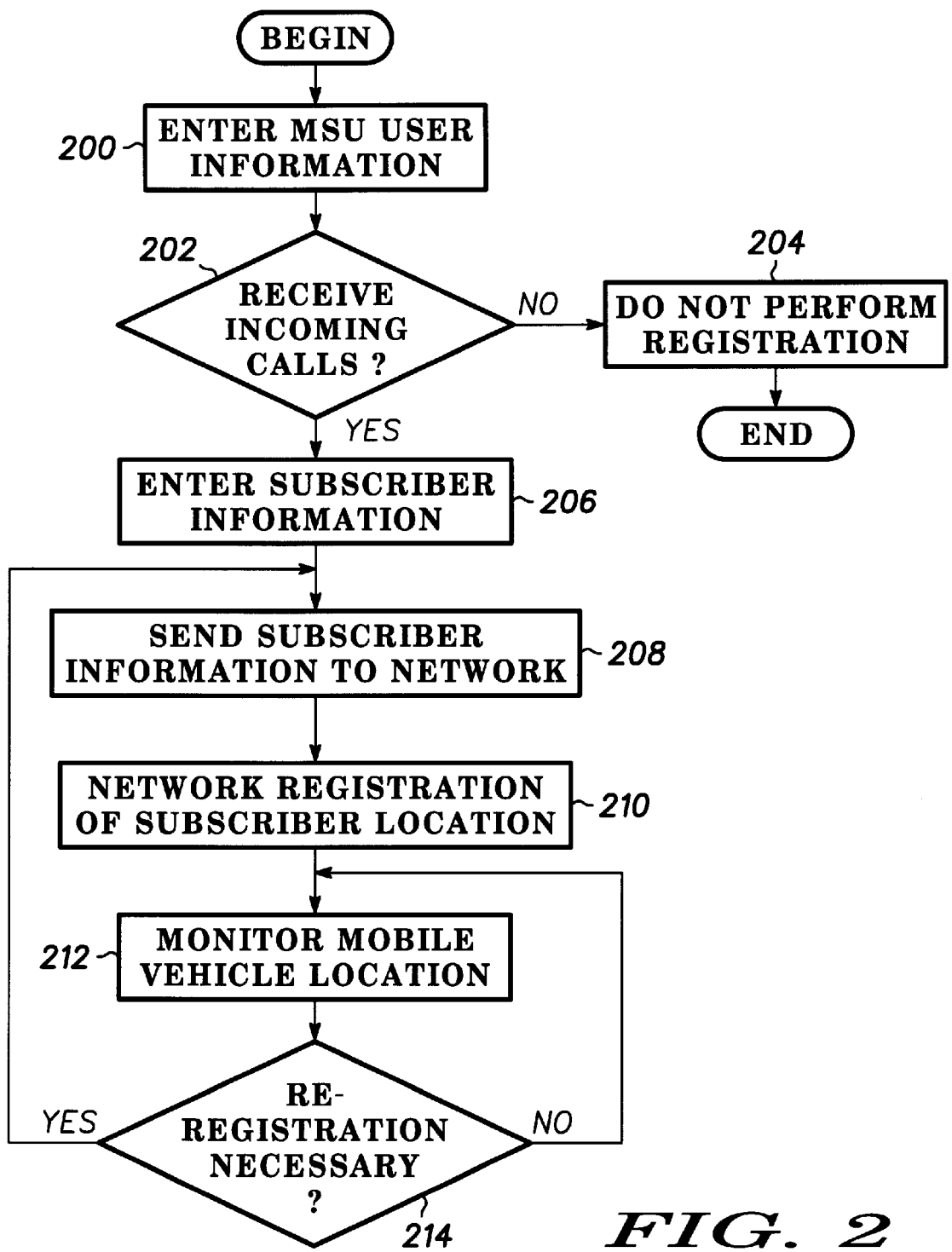
FIG. 2 is a flowchart of a system registration method for a Multiple Subscriber Unit (MSU) user associated with an accessible home communication network in accordance with a preferred embodiment of the present invention.

FIG. 2 is a flowchart of a system registration method for an MSU user associated with an accessible home communication network in accordance with a preferred embodiment of the present invention. To be "associated with an accessible home communication network" means that the home network is currently a service provider for the MSU user (i.e., the MSU user is a "registered subscriber" of the home network), and the home network is accessible to the system (i.e., the home network and system can exchange information between each other). In some cases, the system and the "accessible home communication network" will be one and the same.

The method begins, in step 200, when the MSU user enters MSU user information into a communication unit. MSU user information, for example, could include information which indicates whether the MSU user desires to receive incoming phone calls and/or could be used to determine whether the MSU user is a registered subscriber of a home network.

In step 202, the method determines whether the MSU user desires to receive incoming calls. If not, a system registration process is not necessary and, in a preferred embodiment is not performed in step 204 and the procedure ends. If so, then a system registration process is performed. The process begins by the MSU user entering information into the communication unit in step 206 which, in the case where the MSU user is a subscriber of a home network, could but would not necessarily include subscriber information.

In one embodiment, the MSU can prompt the user to enter his or her subscriber information. Subscriber information can be entered, for example, by entering digits into a keypad of a communication unit, by inserting a magnetically coded card, or when the communication unit or MSU determines the necessity to register autonomously. Subscriber information describes the identity of the subscriber and is unique to the MSU user.

In one embodiment, the subscriber information includes an International Mobile Subscriber Identity (IMSI). An IMSI is a number provided by a subscriber each time he or she accesses a communication system. The IMSI enables a system to derive the identity of the subscriber's home network. In a preferred embodiment, the subscriber information includes a Temporary Mobile Subscriber Identity (TMSI). A TMSI is an alias used instead of an IMSI, when possible, to protect the identity of the subscriber.

The terms "IMSI" and "TMSI" are familiar to those of skill in the art in the context of GSM protocols. Although these terms could have connotations associated with their common usage elsewhere, these connotations are not intended to limit the scope of the present invention. What is important to the present invention is that information identifying the subscriber is sent to the home network. The particular format of the information is not important and the IMSI or TMSI are used for exemplary purposes only.

The communicating unit sends subscriber information (or "registration information") to the MSU and, in step 208, the MSU sends the subscriber information over a communication path to an ET, for example. The ET receives the subscriber information, determines the home network of the subscriber, and sends the information to the home network. Typically, a first link of the communication path is an RF link between the MSU and the communication system. In a preferred embodiment, the first link of the communication path is an RF link between the MSU and a satellite of the communication system. However, a vehicle which can communicate over any other type link can also use the method and apparatus of the present invention. For example, a vehicle which communicates over hard-wired links (e.g., a monorail car) could send the information over a hard-wired link.

In a preferred embodiment, the subscriber information is sent with location information which can be derived by the MSU (e.g., using geolocation). The location information describes the last-known location of the mobile vehicle. Location information is necessary for the home network to know how to route calls to the subscriber and also for billing purposes. In an alternate embodiment, the location information can be derived by the communication system, for example, using Doppler and time delay measurements.

After receiving the subscriber information, the home network then registers the subscriber in step 210. First, the home network performs an authentication procedure to determine whether the subscriber is authorized to use the system. Second, the home network associates the location information with the particular subscriber. In a preferred embodiment, the location information is stored in one or more location registers at the home network. The location registers are typically one or more memory storage devices which contain the last-known locations of communication units (or subscribers) registered with the system. The location information can be received as part of the subscriber information or in a separate message from the communication system.

Once an MSU user is registered, the MSU user will be allowed to use communication resources (e.g., physical equipment) of the MSU in order to receive and make calls with nonpassengers for, in the instance of the vehicle being an airplane, the duration of the flight. This enables an MSU user operating a first communication unit to receive calls from and make calls to a non-passenger operating a second communication unit.

The method and apparatus of the present invention differs from and provides advantages over the prior art in that the method and apparatus of the present invention selectively registers only those passengers who want to receive incoming phone calls. Thus, the method and apparatus of the present invention reduces the number of network registrations performed. In addition, the method and apparatus of the present invention individually registers and tracks the location of each MSU user rather than tracking the location of the mobile vehicle. In other words, the location of each MSU user can be accessed based on the identity of the MSU user, not the identity of the vehicle in which the MSU user is traveling. This aspect of the method and apparatus of the present invention allows an MSU user to receive calls from non-passengers and the non-passengers do not need knowledge of the identity of the vehicle.

When the mobile vehicle is changing position, re-registration occasionally is necessary. The MSU monitors, in step 212, the location of the mobile vehicle and determines, in step 214, whether re-registration of the subscriber is necessary. Re-registration becomes necessary when the location information stored in the location registers becomes obsolete (i.e., the mobile vehicle is too far from the stored location to enable the system to contact the subscriber). In a preferred embodiment, the MSU determines that re-registration is needed when the mobile vehicle has traveled at least a predefined "re-registration distance" from the last registered location. In order to determine the mobile vehicle has traveled the re-registration distance, the MSU must have previously calculated a first location of the mobile vehicle at a first time (e.g., at the last time that registration was performed). Occasionally, the MSU computes the distance from the first location which the mobile vehicle has traveled and determines whether the distance exceeds the re-registration distance from the first location.

The re-registration distance can depend on many factors such as, for example, communication cell size and location, vehicle velocity and altitude, and system parameters. For example, a system using small communication cells to communicate with the MSU would have a relatively short re-registration distance. A system using large communication cells could have a longer re-registration distance.

If re-registration is needed in step 214, the method returns to step 208 and iterates as shown in FIG. 2. If re-registration is not needed in step 214, the method returns to step 212 and iterates as shown in FIG. 2.

Figure 3:
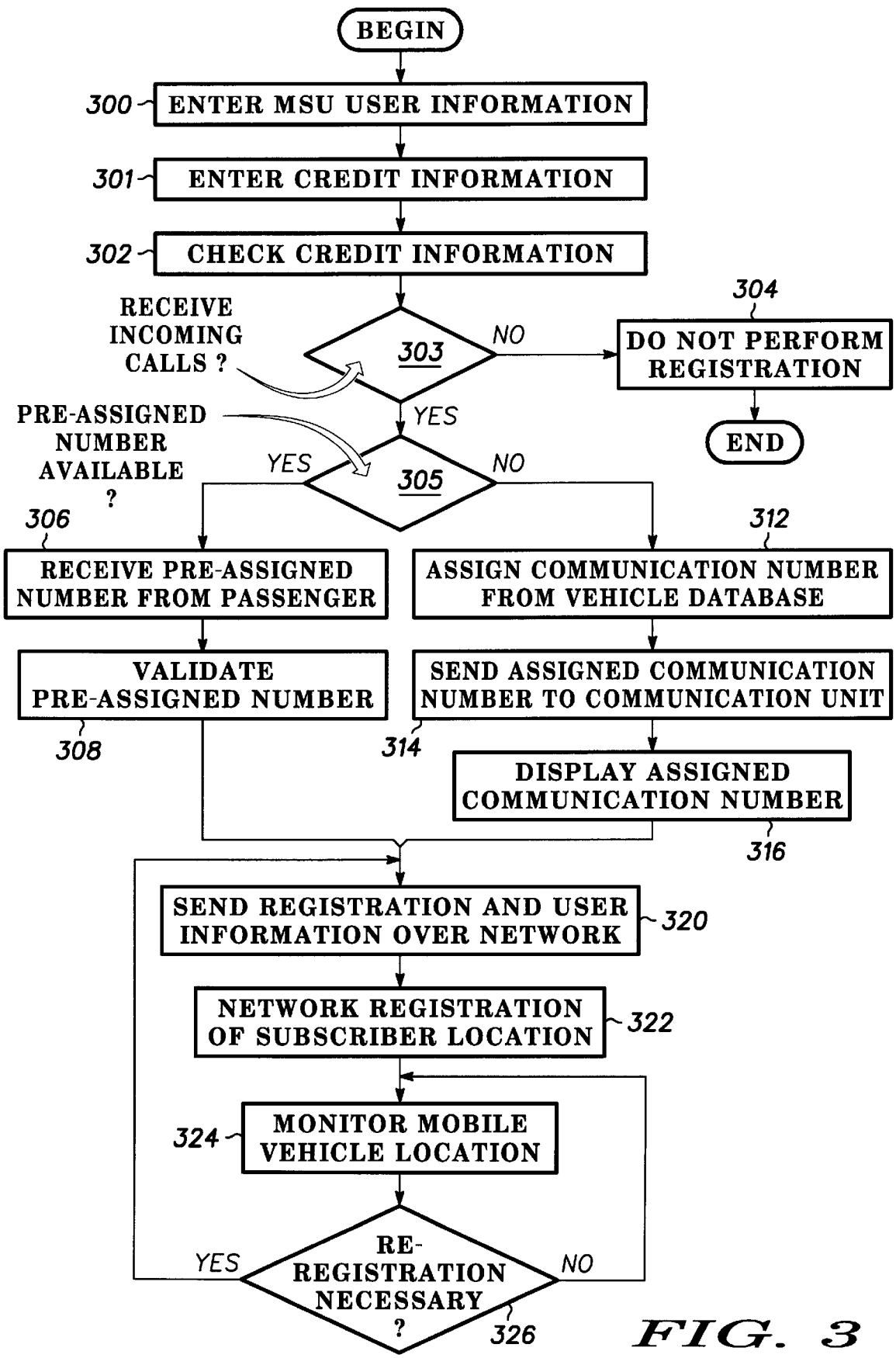
FIG. 3 is a flowchart of a system registration method for an MSU user not associated with an accessible home network in accordance with a preferred embodiment of the present invention.

As explained previously, the method and apparatus of the present invention enables an MSU user who is not associated with an accessible home network (or an MSU user who does not wish to use his or her home network services) also to register with the communication system. FIG. 3 is a flowchart of a system registration method for an MSU user not associated with an accessible home network in accordance with a preferred embodiment of the present invention.

In a preferred embodiment, the method begins when the MSU user enters MSU user information in step 300. MSU user information could include, for example, information used to determine that the MSU user is a registered subscriber of a home network. When the MSU user is not a registered user, the communication unit requests payment information from the user. For example, the user could insert a credit card (or any type of debit card, in step 301, into the communication unit. In an alternate embodiment, the MSU user could instead enter his or her credit card number or other debit information using the communication unit keypad. The method of entering the information is not important. What is important is that the MSU user enters information which ensures that a fee can be collected for later communications between the MSU user and a non-passenger or for providing the MSU user with the opportunity to receive incoming calls.

In step 302, the MSU receives the payment information and, if necessary, performs a preliminary credit check for the MSU user in a preferred embodiment, although step 302 is not required to achieve the advantages of the present invention. The MSU could perform the preliminary credit check, for example, by checking the expiration date of the credit card to make sure that the card is not expired. Alternatively, the communication system could do a preliminary or detailed credit check after the credit information is sent to the system.

After checking the credit information, the MSU user indicates whether he or she desires to receive incoming calls, step 303. If not, the MSU does not perform the registration procedure in step 304 and the procedure ends. If the MSU user desires to receive incoming calls, the MSU determines whether a pre-assigned number is available for the MSU user in step 305. A pre-assigned number would be a number that the communication system assigned to the passenger prior to departure. For example, when a passenger has notified a ticketing agent that the passenger might want to use communication services while traveling, a pre-assigned number could be assigned to the passenger and printed on the passenger's ticket. In a preferred embodiment, where a pre-assigned number has ben previously given to the passenger, steps 301 and 302 could be optional.

Where the MSU determines that a pre-assigned number is available, step 306 is performed, where the MSU receives the pre-assigned number from the MSU user. The MSU user can enter the pre-assigned number into the keypad after being prompted by the MSU, for example. In an alternate embodiment, the MSU might already have knowledge of the pre-assigned number for the particular MSU user and the handset (or seat) which the MSU user would use. For example, the MSU user's pre-assigned number could be entered into the MSU memory by a ticketing agent prior to or after departure. As described below, in an alternate embodiment, the MSU could have a database of assignable numbers which the MSU allocates to passengers at the passenger's request.

The pre-assigned number is also referred to herein as a "communication number". In a preferred embodiment, the communication number is a Mobile Station ISDN number (MSISDN), which is a number that points to a record in a location register for the MSU user. Use of an MSISDN removes the national restriction imposed by "1-800" numbering as in the prior-art systems and, thus, allows international non-subscribers to contact passengers. This record includes all information necessary for finding the final destination of a call directed to the passenger (e.g., the current location of the mobile vehicle). The term "MSISDN" is commonly used in GSM protocols. Although the term MSISDN will be used in this description, use of the term is not intended to be limited by connotations associated with its use in GSM contexts. What is important is that the communication number enables the communication system to locate a registration record for a registered passenger.

The MSU has a pool of available communication numbers which can be used. The pool of available communication numbers represents some of the communication resources of the MSU. Each pre-assigned number must be associated with a communication number of the available pool. After the pre-assigned number is entered, the MSU validates the number in step 308. Validation entails correlating the pre-assigned number with the pool of available communication numbers (e.g., MSISDNs). Where the pre-assigned number does not correlate with one of the available communication numbers, the MSU user is denied service. Where the pre-assigned number does correlate with one of the available communication numbers, the method continues at step 320.

Referring back to step 305, where the MSU determines that no pre-assigned number is available to the MSU user, the MSU assigns, in step 312, a communication number (e.g., an MSISDN) to the MSU user from the pool of communication numbers available to the MSU. This is equivalent to the MSU user "renting" an available communication number. The rented communication number can be assigned for the duration of the trip so that the MSU user can receive incoming calls or for a shorter period of time. The MSU then sends the communication number to the MSU user's communication unit in step 314. The communication unit displays the communication number to the MSU user in step 316.

Whether or not a pre-assigned number is available, the MSU sends registration information describing the MSU user to the communication system in step 320. Steps 320–326 are functionally equivalent to steps 208 through 214 described in conjunction with FIG. 2.

After a passenger has been registered with the communication system, the passenger can receive calls, place calls and receive calls, or place calls. Placing and receiving calls requires communication to be established between the passengers and non-passengers.

Figure 4:
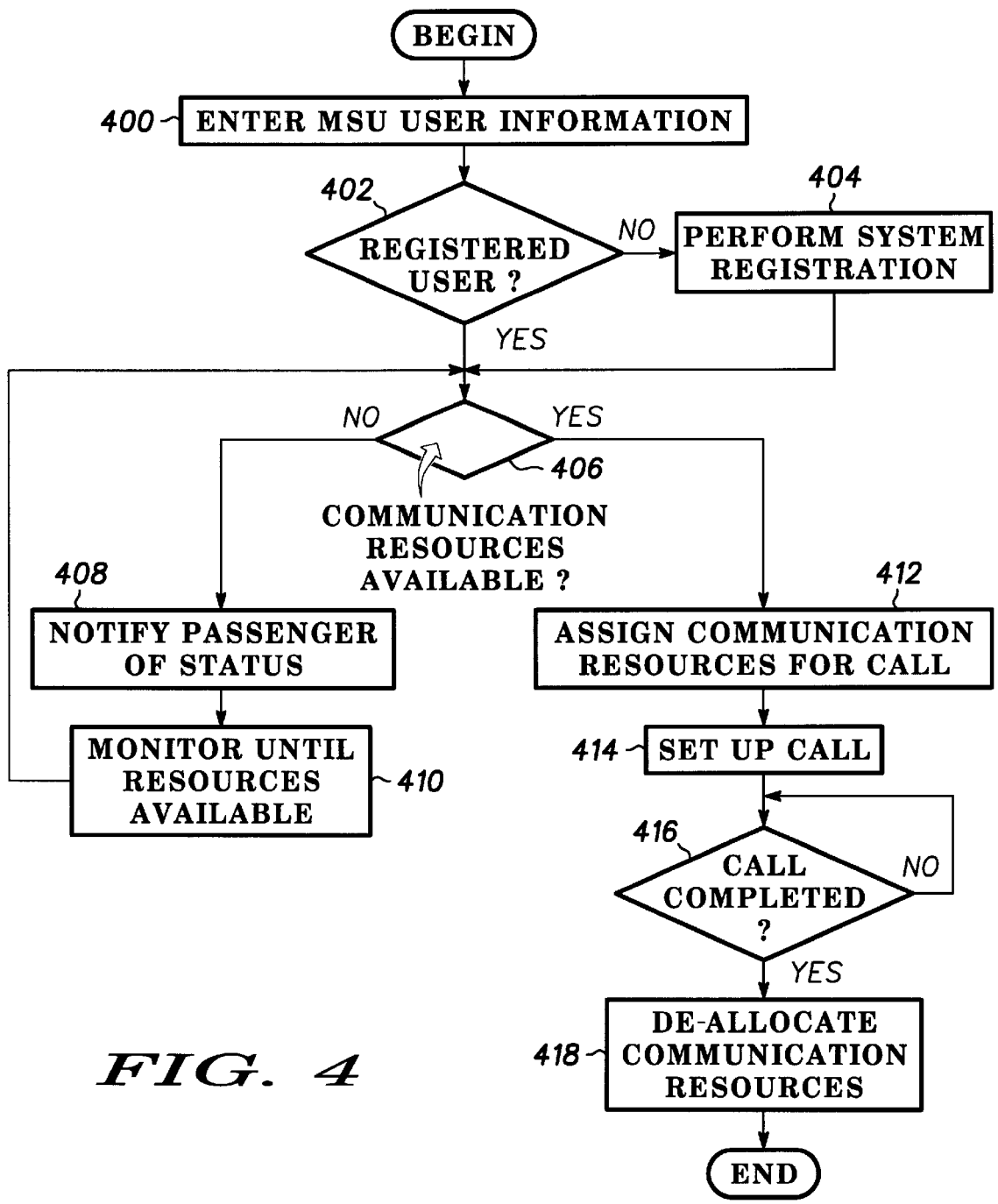
FIG. 4 is a flowchart of a method for link establishment for an MSU user originated communication is accordance with a preferred embodiment of the present invention.

FIG. 4 illustrates a flowchart of a method for link establishment for a passenger originated communication in accordance with a preferred embodiment of the present invention. For a passenger who is traveling on an airplane, this is typically called an "air-to-ground" call. Similarly, a communication originating from a non-passenger is typically called a "ground-to-air" call. This nomenclature will be used herein. However, because the method and apparatus of the present invention also can be used for vehicles that travel or are stationarily located along the ground or in the water, the terms are not meant to be limiting.

The method begins when the MSU receives a request that the MSU user wants to establish a communication path with a non-passenger. For example, the passenger might wish to make an outgoing call such as a phone call, send a facsimile, or page the non-passenger. In a preferred embodiment, the passenger indicates that he or she wants to establish a communication path by entering MSU user information into the communication unit in step 400. The MSU user information can be entered using the communication unit keypad or by inserting a card into the handset. The MSU user information can be, for example, the user's pre-assigned number, assigned communication number, or credit card information.

The MSU determines, in step 402, whether the MSU user previously registered to receive incoming calls. The MSU user is a registered system user if the MSU user has previously performed a registration process. If the MSU user is not a registered user, the MSU user is registered in step 404. Registration entails performing a registration process, if necessary, as described in conjunction with FIG. 2 or FIG. 3. In accordance with a preferred embodiment of the present invention, to minimize loading on the system, only the passengers who have requested to receive incoming calls are registered. Extra IMSIs which are not used are not registered.

If the MSU determines that the MSU user is a registered system user, the MSU determines, in step 406, whether communication resources (e.g., physical equipment) are available to allocate to the MSU user's communication attempt. The MSU is capable of supporting a finite number of communication paths between the MSU and the communication system because physical equipment is required to sustain each communication channel. Where the MSU is experiencing high call demand, resources might not be available for an additional call.

Where communication resources are not available, the MSU notifies the MSU user of the call status (e.g., that a communication path cannot be established at that time because communication resources are not available) in step 408. In a preferred embodiment, in step 410, the MSU then monitors the communication resources to determine when resources become available for the call so that the MSU user can be notified. The procedure iterates as shown in FIG. 4. In an alternate embodiment, the MSU would not monitor the communication resources or notify the MSU user when resources do become available.

If the MSU determines, in step 406, that communication resources are available, the MSU assigns available communication resources to the MSU user in step 412. Then, the MSU assists in setting up the communication path between the MSU user and non-passenger in step 414.

The MSU monitors the call, in step 416, to determine when the call is completed. When the call is not completed, the procedure iterates as shown in FIG. 4. When the call is completed, the MSU de-allocates the communication resources previously allocated to the call in step 418 and the procedure ends.

Figure 5:
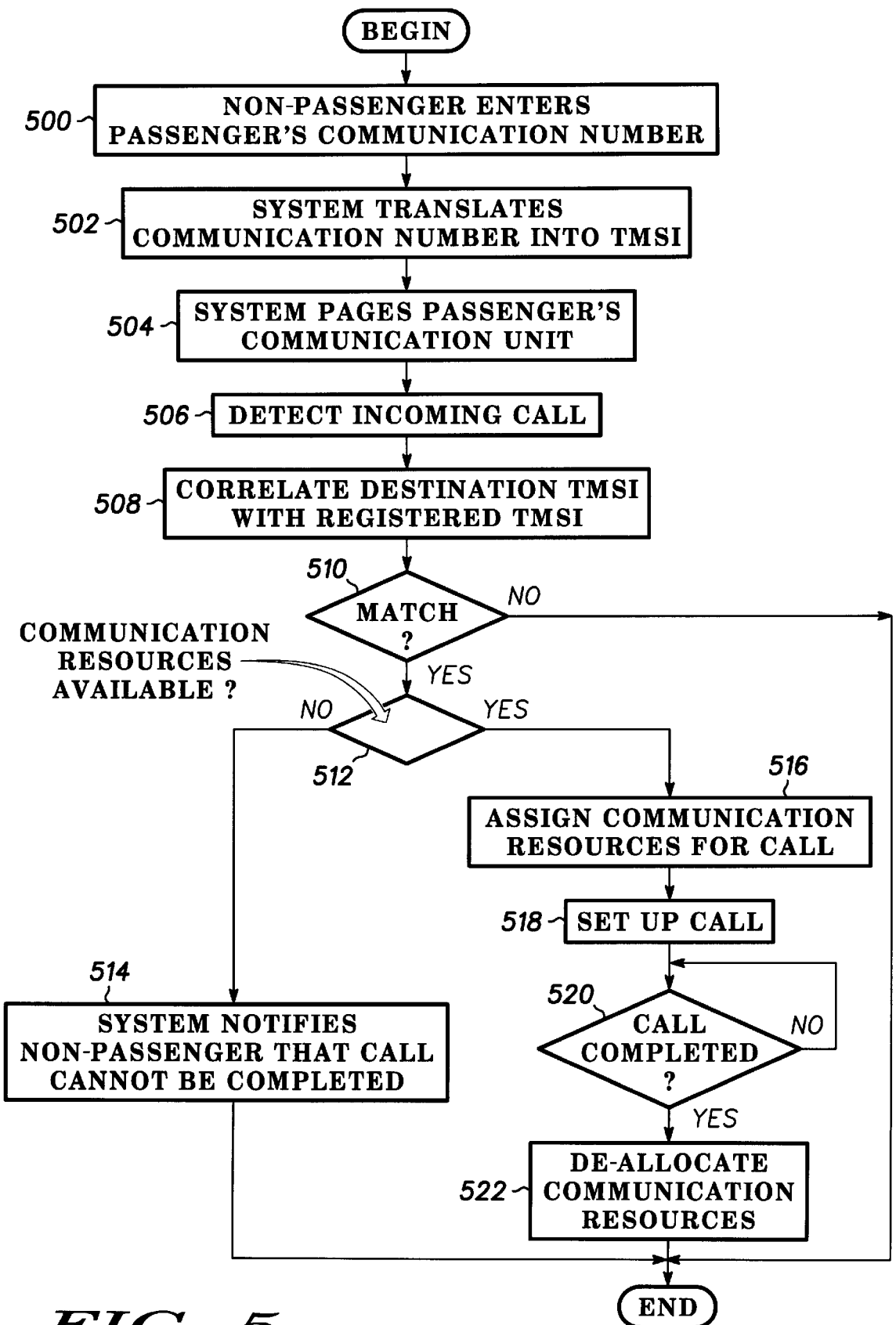
FIG. 5 is a flowchart of a method for link establishment for a communication originating from a non-passenger in accordance with a preferred embodiment of the present invention.

FIG. 5 illustrates a method for link establishment for a communication originating from a non-passenger or other terminal in accordance with a preferred embodiment of the present invention. A communication originating from a non-passenger to a passenger is typically referred to as a "ground-to-air" call, as explained previously.

The method begins in step 500 when the non-passenger makes a call attempt by entering a passenger's communication number (e.g., an MSISDN) into the terminal used by the non-passenger. The passenger's communication number can be thought of broadly as any identification information for the passenger. The non-passenger could have knowledge of the passenger's communication number because the passenger had notified the non-passenger of the communication number prior to departure (e.g., where the passenger has a pre-assigned MSISDN), or because the passenger registered to receive incoming calls notified the non-passenger of the communication number which was assigned to the passenger during the trip.

In a preferred embodiment, a GW receives the entered communication number and translates the entered communication number into an IMSI or TMSI in step 502. In alternate embodiments, any destination identification number can be used. An IMSI or TMSI is used herein for the purposes of description only and not of limitation. In accordance with a preferred embodiment of the present invention, the GW should have registration information only for those MSU users who were registered because they desired to receive incoming calls.

The IMSI or TMSI enables the system to retrieve registration information for the passenger and, thus, to determine the passenger's registered location (i.e., the passenger's last-known location). The registered location could be stored in any form. For example, the location could be identified by a "location area code" which associates a value to a stationary or moving bounded area. Alternatively, the location could be identified by a longitude and latitude, or a range of longitudes or latitudes. The location also could be determined, for example, by extrapolating from a last-known point at which the moving vehicle was located along a vector which describes the direction that the moving vehicle is traveling or expected to be traveling. The particular way that the registered location is identified is not crucial to the present invention.

Once the system determines the passenger's registered location, in step 504, the system attempts to contact the passenger's communication unit by paging (i.e., ringing) the communication unit in the vicinity of the registered location. The system sends, or broadcasts, a call request to that vicinity. Assuming that the mobile vehicle is still in the vicinity of the registered location, the MSU detects the incoming call request in step 506. From the incoming call request, the MSU extracts the destination TMSI and, in step 508, correlates the destination TMSI with the list of TMSIs previously registered with the MSU (referred to as "previously registered identification numbers").

The MSU determines whether a match is found between the destination TMSI and the registered TMSIs in step 510. If no match is found (i.e., there is no correlation), the destination TMSI is not registered to receive incoming calls and the procedure ends. If a match is found (i.e., there is a correlation), the MSU determines, in step 512, whether communication resources are available to allocate to the incoming call. In a preferred embodiment, when communication resource are available, the MSU informs the system of the condition and the system, in turn, notifies the non-passenger that the call cannot be completed in step 514.

When communication resources are available to support the call, the MSU assists in establishing a communication path between the non-passenger and a communication unit on which the MSU user can receive the incoming call. First, the MSU assigns communication resources to the call in step 516. Then, the MSU and GW support establishment of a communication path between the non-passenger and passenger in step 518.

The MSU monitors the call, in step 520, to determine when the call is completed. When the call is not completed, the procedure iterates as shown in FIG. 5. When the call is completed, the MSU de-allocates the communication resources previously allocated to the call in step 522 and the procedure ends.

Figure 6:
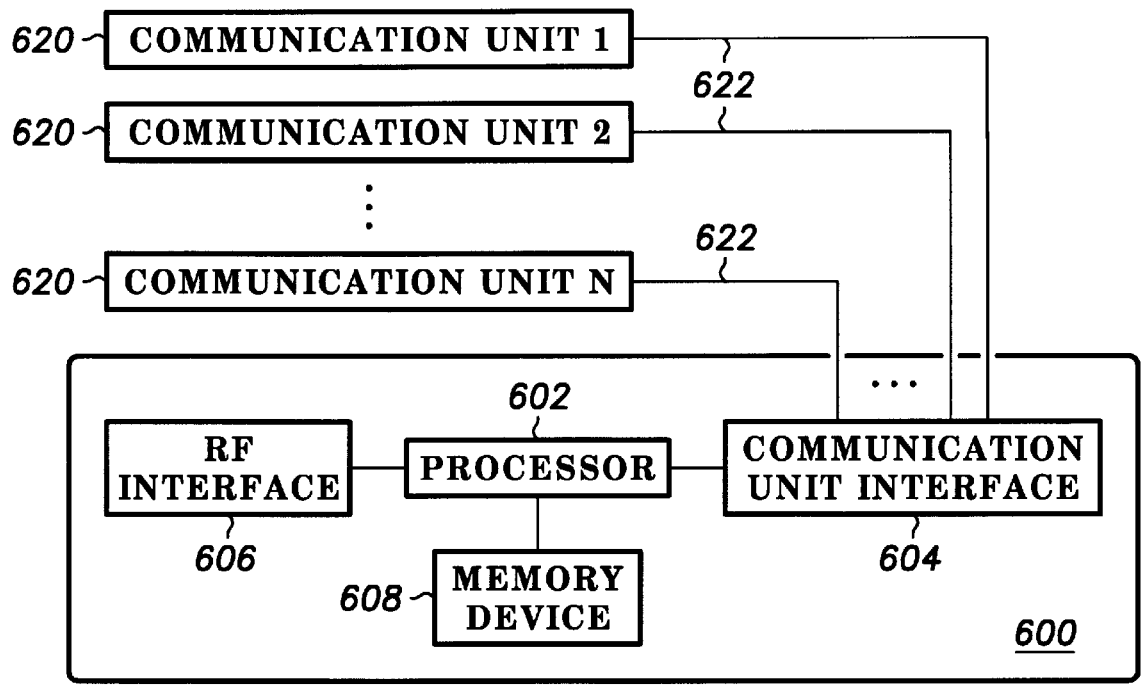
FIG. 6 is a block diagram of an MSU in accordance with a preferred embodiment of the present invention.

FIG. 6 illustrates a block diagram of MSU 600 in accordance with a preferred embodiment of the present invention. MSU 600 is used to provide communication capabilities for multiple communication units 620, where MSU 600 and communication units 620 are co-located on a mobile vehicle. MSU 600 could also be located in a stationary facility. In a preferred embodiment, MSU 600 includes processor 602, communication unit interface 604, RF interface 606, and memory device 608. In an alternate embodiment, MSU 600 need not include memory device 608.

Communication unit interface 604 enables processor 602 to exchange data and messages with communication units 620 over links 622. Links 622 can be hard-wired or RF communication links. Data and messages exchanged between processor 602 and communication units 620 include, but are not limited to, MSU user information, information indicating whether the MSU user desires to receive incoming calls, registration status information, billing information, and speech/data/fax information.

Processor 602 collects registration information from the users of communication units 620 and sends the registration information via RF interface 606 to the communication system for those MSU users who want to receive incoming calls.

Processor 602 also performs re-registration when necessary. During an attempt to establish an air-to-ground call, processor 602 receives an indication that the MSU user wants to establish a communication path with another terminal and determines whether communication resources are available to support the call. If so, processor 602 assigns resources to the call and assists in call setup between the MSU user and the non-passenger. If not, processor 602 can notify the MSU user that the call cannot be completed at that time.

During an attempt to establish a ground-to-air call, processor 602 detects an incoming communication request which was originated by another terminal. Processor 602 correlates a destination identification number in the request with a list of previously registered identification numbers for MSU users who have indicated a desire to receive incoming calls. Where a correlation exists, processor 602 assists in setting up the call. Processor 602 also performs other functions as described in FIGS. 2–5.

Memory device 608 is used to store information which processor 602 requires in order to perform its necessary functions. Memory device 608 can be a random access memory, read only memory, or any other type of storage medium and can be integral with or separate from processor 602. For example, memory device 608 could store the list of previously registered identification numbers for MSU users or the list of available MSISDNs.

As described previously, MSU 600 sends registration information directly or indirectly to an ET (e.g., ET 102, FIG. 1). In conjunction with a GW (e.g., GW 104, FIG. 1), the ET attempts to register each user. In a preferred embodiment, only those passengers who have indicated a desire to receive incoming calls are registered.

Figure 7:
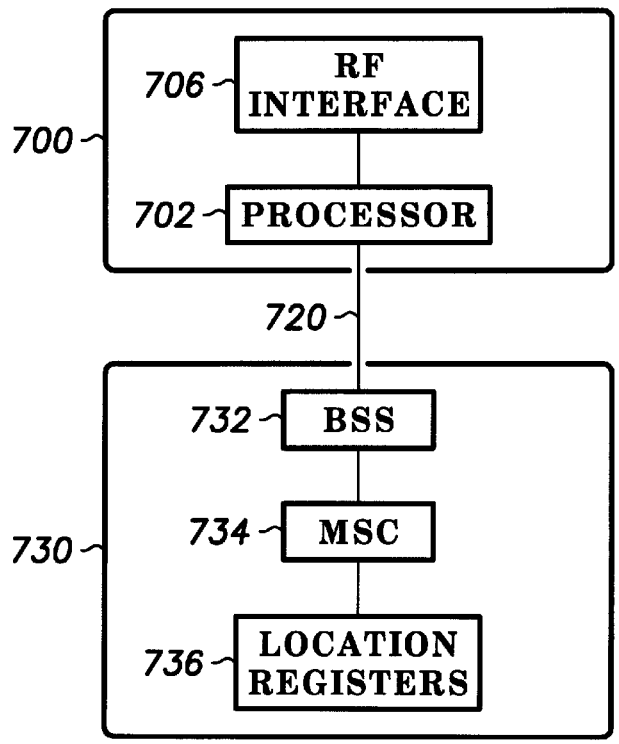
FIG. 7 is a block diagram of an Earth Terminal (ET) apparatus and a Gateway (GW) apparatus which support registration and communication for co-located mobile user groups in accordance with a preferred embodiment of the present invention.

FIG. 7 illustrates a block diagram of ET apparatus 700 and GW apparatus 730 which support registration and call setup for co-located mobile communication unit groups in accordance with the present invention. In a preferred embodiment, ET apparatus 700 includes processor 702 and RF interface 706. ET 700 communicates either directly or indirectly with an MSU (e.g., MSU 600, FIG. 6) via RF interface 706. Processor 702 is used to coordinate those communications.

ET apparatus 700 is in communication contact with GW apparatus 730 over link 720. Link 720 can be a hard-wired or RF link which could include one or more intermediate relay nodes (e.g., RF repeaters such as satellites).

GW apparatus 730 includes Base Station Subsystem 732 (BSS), Mobile Switching Center 734 (MSC), and location registers 736. BSS 732 provides and manages transmission paths between communication units and MSC 734. MSC 734 is a point where user authentication is performed and where communications transit between the system and another network (e.g., a PSTN or other communication network). To determine whether a communication unit is allowed to use the system's services, registration information identifying, the communication unit is sent from BSS 732 to MSC 734. After receiving the registration information, MSC 734 performs an authentication procedure to determine whether the communication unit is authorized to use the system. For a communication unit in roaming mode, MSC 734 also determines whether the system and the communication unit's home system have an agreement in place which ensures that the system will receive compensation for service it provides to the communication unit.

In a preferred embodiment, location registers 736 are coupled to MSC 734. Location registers 736 are typically one or more memory storage devices which contain the last known locations of communication units registered with the system. Where a communication unit is co-located with a mobile vehicle, the location information describes the last-known location of the mobile vehicle. The location information can be received as part of the registration information or in a message from the communication system.

Although BSS 732 and MSC 734 are names of devices familiar to those of skill in the art, the functions of the BSS 732 and MSC 734 for the purposes of this description are explained herein. Limitations associated with the use of these names in other contexts are not intended to limit the scope of the present invention.

The method and apparatus of the present invention provides numerous advantages. For example, the method and apparatus provides selective system registration of only those MSU users who desire to receive incoming phone calls, thus reducing system registration and re-registration traffic. In addition, the method and apparatus enables direct inward dialing to a passenger who has registered to receive incoming calls by utilizing one-stage dialing rather than two-stage dialing with callback. The method and apparatus of the present invention also provides communication services to a member of a mobile user-group who has not been pre-assigned a user code or PIN by the system.

The invention has been described with reference to preferred embodiments. Those skilled in the art will recognize that various changes and modifications may be made in the preferred embodiments without departing from the spirit or scope of the present invention. These changes and modifications are intended to be included within the scope of the present invention.

What is claimed is:

1. A method for reducing a number of network registrations performed by a multiple subscriber unit (MSU) co-located with a mobile vehicle, wherein the MSU is coupled to a plurality of communication units capable of being operated by a plurality of MSU users to communicate with a plurality of other terminals, the method, performed by the MSU, comprising the steps of:

a) receiving MSU user information from a communication unit operated by an MSU user;

b) determining, from the MSU user information, whether the MSU user desires to receive incoming phone calls on the communication unit;

c) not sending registration information to a communication network which is not co-located with the MSU if the MSU user information indicates that the MSU user does not desire to receive the incoming phone calls; and d) sending the registration information to the communication network if the MSU user information indicates that the MSU user does desire to receive the incoming phone calls so that the communication network can register the communication unit.

2. The method as claimed in claim 1, wherein the performing step comprises the step of:

d1) determining, from the MSU user information, whether the MSU user is a registered subscriber of a home network.

3. The method as claimed in claim 2, wherein the performing step further comprises the step of:

d2) if the MSU user is the registered subscriber, sending registration information to the home network.

4. The method as claimed in claim 2, further comprising the steps of:

e) if the MSU user is not the registered subscriber, using the communication unit to request payment information from the MSU user;

f) receiving the payment information for the MSU user; and wherein the performing step comprises the step of sending registration information to a network.

5. The method as claimed in claim 4, further comprising the step of:
   g) as a result of receiving the payment information, assigning communication resources to the MSU user.

6. The method as claimed in claim 5, wherein the assigning step comprises the steps of:
   g1) assigning a communication number to the MSU user from a pool of available communication numbers; and
   g2) sending the communication number to the communication unit so that the communication unit can display the communication number to the MSU user.

7. The methods as claimed in claim 1, wherein the performing step comprises the step of:
   d1) sending registration information over a communication path, wherein a first link of the communication path is a radio-frequency link between the mobile vehicle and a satellite.

8. The method as claimed in claim 1, further comprising the step of:
   e) assigning communication resources to the MSU user for a period of time.

9. The method as claimed in claim 1, further comprising the steps of:
   e) calculating a first location of the mobile vehicle at a first time;
   f) computing a distance from the first location which the mobile vehicle has traveled;
   g) determining whether the distance exceeds a re-registration distance; and
   h) when the distance does exceed the re-registration distance, repeating the performing step if the MSU user information indicated that the MSU user does desire to receive the incoming phone calls.

10. A method for reducing a number of network registrations performed by a multiple subscriber unit (MSU) co-located with a mobile vehicle, wherein the MSU is coupled to a plurality of communication units capable of being operated by a plurality of MSU users to communicate with a plurality of other terminals, the method, performed by the MSU, comprising the steps of:
   a) receiving a request to make an outgoing call from a communication unit operated by an MSU user;
   b) determining whether the MSU user previously registered to receive incoming phone calls;
   c) if the MSU user has not previously registered, determining from MSU user information whether the MSU user desires to receive the incoming phone calls;
   d) not sending registration information to a communication system which is not co-located with the MSU if the MSU user information indicates that the MSU user does not desire to receive the incoming phone calls;
   e) sending the registration information to the communication system if the MSU user information indicates that the MSU user does desire to receive the incoming phone calls so that the communication system can register the communication unit; and
   f) assisting in setting up the outgoing call.

11. The method as claimed in claim 10, wherein the assisting step comprises the steps of:
   f1) determining whether the MSU has available resources to assign to the outgoing call; and
   f2) if the MSU does have the available resources, setting up the outgoing call.

12. A multiple subscriber unit (MSU) located on a mobile vehicle for supporting communication paths between communication units coupled to the MSU and other terminals, wherein the communication units are capable of being operated by a plurality of MSU users, the MSU comprising:
   a processor suitable to receive MSU user information from a communication unit operated by an MSU user, to determine, from the MSU user information, whether the MSU user desires to receive incoming phone calls on the communication unit, to not send registration information to a communication network which is not co-located with the MSU if the MSU user information indicates that the MSU user does not desire to receive the incoming phone calls, and to send the registration information to the communication network if the MSU user information indicates that the MSU user does desire to receive the incoming phone calls so that the communication network can register the communication unit; and
   a radio frequency interface coupled to the processor suitable to send the registration information to the communication system and to support a communication link between the MSU and the communication system.

13. The MSU as claimed in claim 12, wherein the processor is further suitable to determine, from the MSU user information, whether the MSU user is a registered subscriber of a home network and, if the MSU user is the registered subscriber, to send the registration information to the home network using the radio frequency interface.

14. The MSU as claimed in claim 12, wherein:
   the radio frequency interface is further suitable to support the communication link between the MSU and a satellite.

15. The MSU as claimed in claim 12, wherein the processor is further suitable to calculate a first location of the mobile vehicle at a first time, to compute a distance from the first location which the mobile vehicle has traveled, to determine whether the distance exceeds a re-registration distance, and, if so, to again perform the system registration process if the MSU user information indicated that the MSU user does desire to receive the incoming phone calls.

16. A multiple subscriber unit (MSU) located on a mobile vehicle for supporting communication paths between communication units coupled to the MSU and other terminals, wherein the communication units are capable of being operated by a plurality of MSU users, the MSU comprising:
   a processor suitable to receive a request to make an outgoing call from a communication unit operated by an MSU user, to determine whether the MSU user previously registered to receive incoming phone calls, wherein if the MSU user has not previously registered, to determine from MSU user information whether the MSU user desires to receive the incoming phone calls, not to send registration information to a communication system which is not co-located with the MSU if the MSU user information indicates that the MSU user does not desire to receive the incoming phone calls, to send the registration information to the communication system if the MSU user information indicates that the MSU user does desire to receive the incoming phone calls so that the communication system can register the communication unit, and to assist in setting up the outgoing call; and
   a radio frequency interface coupled to the processor suitable to send the registration information to the communication system and to support a communication link between the MSU and the communication system.

17. The MSU as claimed in claim 16, wherein the processor is further suitable to determine whether the MSU has available resources to assign to the outgoing call, and, if the MSU does have the available resources, to set up the outgoing call.

* * * * *